PROCESS FOR THE PRODUCTION OF A CONTROLLABLE SEMICONDUCTOR ELEMENT WITH A PNPN STRUCTURE WITH SHORT-CIRCUITS IN THE EMITTER ZONE

Filed Aug. 29, 1967 2 Sheets-Sheet 1

INVENTOR.
Edouard Eugster
BY
Pierce, Scheffler & Parker
Attorneys

INVENTOR.
Edouard Eugster
BY
Pierce, Scheffler & Parker
Attorneys

United States Patent Office 3,494,791
Patented Feb. 10, 1970

3,494,791

PROCESS FOR THE PRODUCTION OF A CONTROLLABLE SEMICONDUCTOR ELEMENT WITH A PNPN STRUCTURE WITH SHORT-CIRCUITS IN THE EMITTER ZONE

Edouard Eugster, Windisch, Switzerland, assignor to Aktiengesellschaft Brown Boveri & Cie, Baden, Switzerland, a joint-stock company Filed Aug. 29, 1967, Ser. No. 664,121
Claims priority, application Switzerland, Sept. 27, 1966, 13,939/66
Int. Cl. B44d *1/18, 1/20*
U.S. Cl. 117—213 8 Claims

ABSTRACT OF THE DISCLOSURE

A method of producing a semiconductor element with a pnpn structure and wherein the emitter zone is provided with a plurality of short-circuits comprises the steps of etching away the emitter zone of the semiconductor material at a plurality of discrete locations, continuously measuring, during the etching operation, the *dU/dt* behavior of the semiconductor element (wherein U represents the anode-emitter voltage) and/or continuously measuring the triggering current reached between the anode and a measuring electrode which is galvanically connected to the emitter zone and the etching agent, terminating the etching operation when a predetermined *dU/dt* behavior and/or a predetermined triggering current is reached, and establishing an electrically conductive connection via the remaining emitter surface and the etched semiconductor surface.

Etching is done by a liquid etching agent in contact with the emitter zone only at the discrete locations provided, the *dU/dt* behavior and the triggering current are measured by applying voltage pulses from a pulse generator between the anode of the semiconductor element and a measuring electrode connected to the emitter and to the etching agent, and the etching operation is terminated by rinsing away the etching agent with a stream of water from a nozzle which is turned on by an electromagnetically controlled valve when the predetermined values for the *dU/dt* behavior and/or the triggering current have been reached.

This invention relates to a process for the production of a semiconductor element with a pnpn structure, the emitter zone being short-circuited at a plurality of locations.

The originally developed semiconductor elements with a pnpn structure (thyristors) exhibited the property, disadvantageous for many uses, of firing even within the cut-off region of the static characteristic curve when the anode voltage rose rapidly (large *dU/dt*). This phenomenon arises from the fact that when there is a rapid rise in anode voltage to charge up the self-capacity of the p-n junction, which is in the cut-off condition, a current having an action similar to that of a firing pulse flows for a short time. In order to correct this disadvantageous behavior, it has been proposed to provide the emitter zone with short-circuits at various locations on the surface of the semiconductor. The said charging current then flows for the most part via these short-circuits, being thus to a large extent kept away from the p-n junction between the emitter and control zone, and it can therefore only have a considerably smaller effect on the firing behavior. These short-circuits have further consequences, however. In fact, as regards the transistor system formed by the emitter, control and middle zones, they alter the current-dependence of the amplification factor $\alpha$ in such a direction that the critical value for the start of triggering is reached only at a higher current value which rises as the short-circuits extend. The short-circuits thus result in an increase in the triggering current $J_k$, and thus an increase in the limiting temperature which has a decisive effect on definite and stable triggering behavior.

In a known process, these short-circuits across the emitter zone are made by means of the oxide-mask method on a pnpn structure produced by diffusion. However, the said variation in the amplification factor $\alpha$ which decides the amount of triggering current depends on a plurality of parameters, which cannot be reproduced with sufficient accuracy with this production process. Therefore, the triggering current reached and the *dU/dt* behavior often differ greatly from element to element.

It is the object of the invention to provide a process for the production of a controllable semiconductor element with a pnpn structure and short-circuits in the emitter zone which does not exhibit this disadvantage of known processes.

The process according to the invention is characterized by the production of a pnpn structure with a temporary protective layer adjoining the emitter zone and provided with perforations, by the application of an electrically conductive etching agent which does not attack this layer, for the purpose of etching away the semiconductor material at the locations of the perforations, continuous measurement being simultaneously made of the *dU/dt* behavior and/or the triggering current reached between the anode and a measuring electrode which is galvanically connected together to the emitter zone and the etching agent, by continuing the etching operation until a definite *dU/dt* behavior and/or a definite triggering current is reached, and by making an electrically conductive connection via the remaining emitter surface and the etched semiconductor surface after removing the protective layer.

The invention will be explained hereinafter by way of example with reference to the accompanying drawings wherein.

Figure 1:
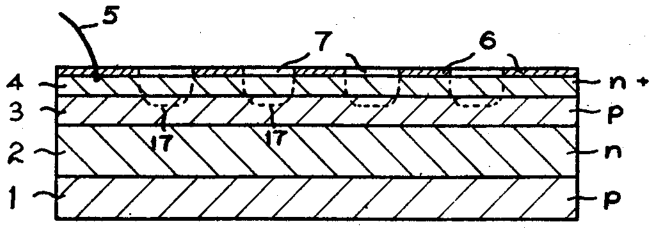
FIGURE 1 is section through a portion of a silicon monocrystal disc produced in accordance with improved process according to the invention at an intermediate stage of the process.

With reference now to the drawings, and in particular to FIGURE 1, this view shows a part-section through a pnpn+structure in a silicon monocrystal disc i.e. a "slice," in which an anode zone 1 exhibiting conduction of the p type is followed by a middle zone 2 exhibiting conduction of the n type, a control zone 3 exhibiting conduction of the p type, and finally a more highly doped (n+) emitter zone. In producing this structure, a start is made as is customary from a semiconductor slice exhibiting conduction of the n type, and having a suitable doping material diffused in on its faces in order to form the zones 1 to 3. The emitter zone 4 is formed thereafter by a further step of diffusion. The emitter zone is then joined in the vicinity of the edge by means of thermo-compression soldering to a gold wire which serves as the measuring electrode 5. A suitable protective paint (for example picene dissolved in acetone) is then coated to the emitter zone in the form of a layer 6, in which a plurality of perforations 7 is cut away by a regular raster.

Figure 2:
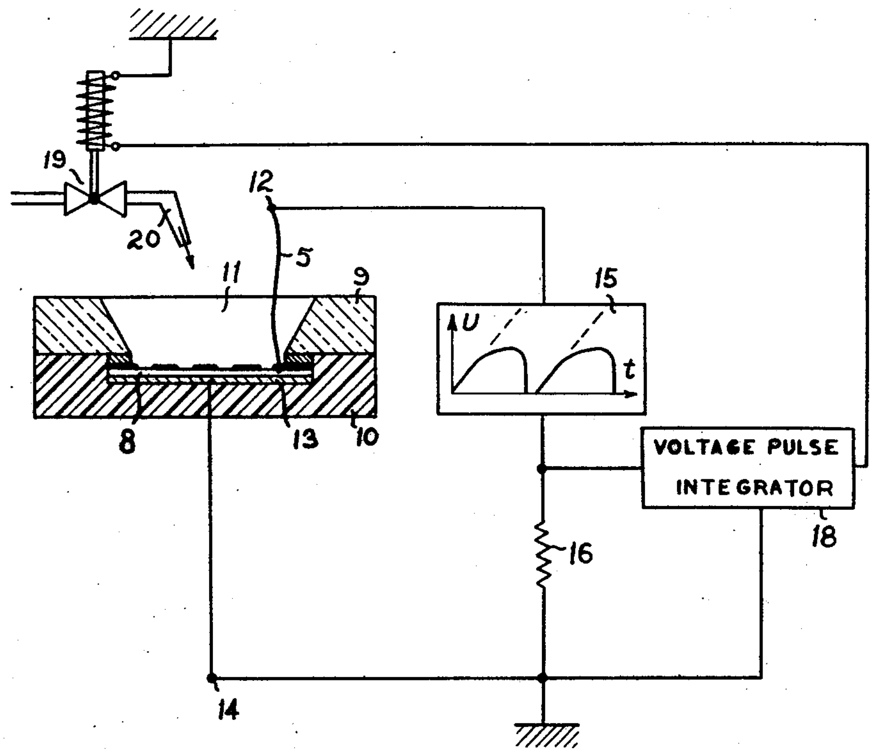
FIGURE 2 is a schematic view of the apparatus involved in carrying out the improved process.

The emitter short-circuits are now produced by means of an etching operation according to FIGURE 2. For this purpose, the semiconductor disc 8 is clamped into an etching mould consisting of an upper annular insulator 9 and a lower Teflon body 10 having a recess 10*a* within which the disc 8 is placed in such a manner that the insulator 9 and the emitter zone of the semiconductor member form the side wall and bottom respectively of a beaker for the reception of an etching agent 11. The measuring electrode 5 joined to the emitter zone is brought out bare, and joined to a first measuring connection 12. Seated on the bottom of recess 10*a* is an electrode 13 which is in surface contact with the bottom anode zone of the semiconductor member 8 and this electrode 13 is joined to a second measuring connection 14. A measuring-pulse-generator 15 is connected via a resistance 16 and the measuring connections 12 and 14 to the semiconductor element in the etching mould, and continuously delivers voltage-pulses with about half the amplitude of the triggering voltage, and with a predetermined $dU/dt$ on its rising flanks, corresponding to a $dU/dt$ at which the semiconductor element should fire without the emitter short-circuits which are to be applied, but at which it should no longer fire after these short-circuits have been produced.

Figure 3:
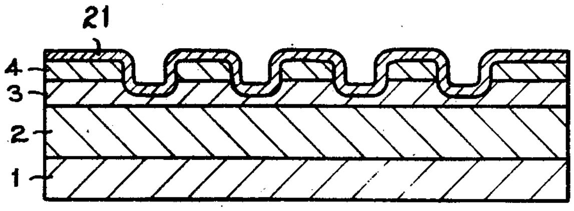
FIGURE 3 is a view similar to FIGURE 1 showing the structure of the semiconductor disc in its final form.

The etching operation is now as follows: After the measuring-pulse-generator 15 has been switched on, an etching agent, for example, a mixture of four parts by volume of $HNO_3$, two of $CH_3COOH$ and one and a half of HF, is introduced into the etching mould. The layer of paint 6 resists this etching agent, so that only at the perforations 7 is the emitter zone, and finally part of the control zone, removed by the etching agent, leaving exposed surfaces at these locations substantially in accordance with the broken lines 17 in FIGURE 1. These surfaces are connected in low-resistance fashion to the uninsulated measuring electrode 5 via the electrically conductive etching agent 11, with the result that the emitter zone is practically short-circuited at the locations 7. As long as the pulses delivered by the measuring-pulse-generator 15 while etching is in progress cause the semiconductor element to fire, a voltage-pulse appears across the resistance 16 upon firing is integrated in the control appliance 18, and reinforces the holding current of an electromagnetically controlled valve 19 which cuts off the water supply to a nozzle 20. When the semiconductor element no longer fires as etching continues, the holding current disappears, the valve 19 opens, and a stream of water from the nozzle 20 rinses the etching solution 11 away, and thus brings the etching operation to an end. After etching has been completed, the layer of paint 6 is removed, and a layer of nickel 21 (FIGURE 3) is applied over the remaining emitter surface and the etched semiconductor surface, for example, by vapor-coating in vacuo, and is thereafter sintered in at 900° C. for about 2 hours.

Figure 4:
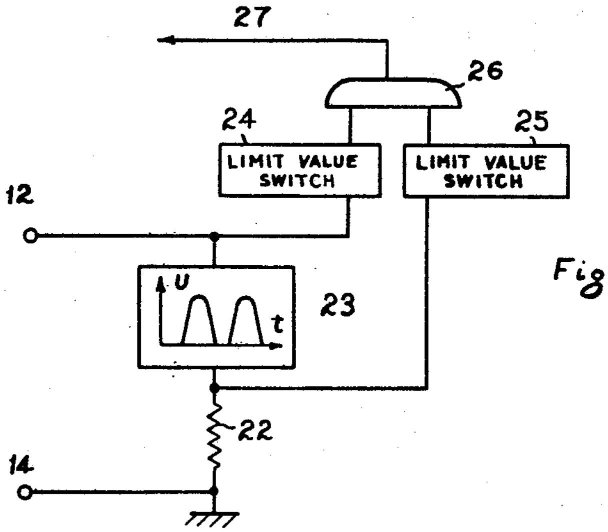
FIGURE 4 is a circuit diagram of an electrical apparatus used in the process.

Shoud the $dU/dt$ behavior be less decisive in designing the semiconductor element than an accurately defined triggering current $J_k$, a pulse-generator 23 is connected via a resistance 22 across the terminals 12, 14 according to FIGURE 4. When the voltage across the measuring connections 12, 14 and the current flowing via the semiconductor element both simultaneously exceed definite adjustable limiting values, the "And" gate 26 fed by the limiting-value switches 24 and 25 delivers an opening signal to an electromagnetic valve via the lead 27, similarly to the circuit according to FIGURE 2, which valve turns on the water supply to rinse the etching solution away.

The devices according to FIGURE 2 and FIGURE 4 may, if necessary, be combined with the aid of a change-over device to form a single measuring device, pulses from the generators 15 and 23 being alternately fed to the measuring connections 12 and 14. In this connection, the etching operation is brought to an end by opening the valve 19 by means of a logic circuit in accordance with a desired logical association between the conditions to be attained.

The process according to the invention may also be carried out on a semiconductor element with an alloyed-on emitter zone. In this connection, the emitter zone 4 is produced as usual by alloying on a gold foil containing antimony. A covering layer comprising apertures at definite locations is applied to the gold foil by a masking method. The gold foil is thereupon etched away with aqua regia at the locations which have been left exposed, and the covering layer is then removed. The gold foil now constitutes the mask for the etching operation for producing the emitter short-circuits. It has the advantage that it need not be removed before the electrically conductive connection is made between the remaining emitter surface and the etched semiconductor surface. Furthermore, the measuring electrode in the case of this variant may take the form of a contact spring which ensures uniform good contact with the whole emitter surface via the gold foil once the semiconductor element has been inserted into the etching mould.

I claim:

1. The process for producing from a semiconductor element starting material having a four-zone pnpn structure wherein one outer zone is the anode and the other outer zone is the emitter beneath which lies a control zone, a semiconductor structure wherein said emitter zone is short-circuited at a plurality of locations which comprises the steps of applying a temporary protective perforated layer to the surface of said emitter zone, etching away those portions of said emitter zone exposed through said perforations with an electrically conductive etching agent which does not attack said perforated protective layer, measuring the $dU/dt$ behavior, wherein U represents the anode zone-emitter voltage, and/or the triggering current reached between said anode zone and a measuring electrode galvanically connected to said emitter zone and to said etching agent during the etching step, terminating the etching step when said $dU/dt$ behavior and/or said triggering voltage reach predetermined values, establishing an electrically conductive connection between the remaining surface of said emitter zone and the etched surfaces of said control zone reached by said etching agent after removal of said portions of the emitter zone, and removing said protective layer.

2. The process as defined in claim 1 wherein said electrically conductive connection between the remaining surface of said emitter zone and the etched surfaces of said control zone reached by said etching agent after removal of said portions of said emitter zone is established by applying a layer of nickel to the surface of said emitter zone after removing said protective layer.

3. The process as defined in claim 2 wherein said layer of nickel is produced by vapor-coating and is thereafter sintered in.

4. The process as defined in claim 1 and which includes the further step of establishing the emitter zone of said semiconductor starting material by alloying in a gold foil containing antimony onto the surface of a pnp semiconductor structure, and wherein said protective perforated layer is applied to said gold foil which is then etched away by an auxiliary etching agent at the perforations in said protective layer prior to etching to produce said emitter short-circuits.

5. The process as defined in claim 1 wherein said etching step is terminated by the expedient of rinsing away the etching agent.

6. The process as defined in claim 1 wherein the $dU/dt$ behavior is measured by applying voltage pulses periodically between said measuring electrode and said anode zone, said voltage pulses having an amplitude less than that required to trigger the semiconductor element and having a $dU/dt$ characteristic at which said semiconductor element should fire without the emitter short-circuits to be established but at which the semiconductor element should no longer fire after said short-circuits have been produced, and wherein said etching step is terminated by rinsing away said etching agent when said semiconductor element no longer fires.

7. The process as defined in claim 1 wherein the triggering current is measured by applying voltage pulses periodically between said measuring electrode and said anode zone, said voltage pulses having an amplitude greater than that required to trigger the semiconductor element, and wherein said etching step is terminated by rinsing away said etching agent when the associated predetermined values of current and voltage between the semiconductor anode and measuring electrode are simultaneously exceeded.

8. The process as defined in claim 1 wherein said measuring electrode is constituted by a bare electrically conductive metallic wire in direct contact with said etching agent.

References Cited

UNITED STATES PATENTS

| | | | |
|---|---|---|---|
| 2,923,868 | 2/1960 | Giacoletto | 29—575 XR |
| 3,163,568 | 12/1964 | LeMieux | 156—17 |
| 3,343,048 | 9/1967 | Kuehn et al. | 317—235 XR |
| 3,365,794 | 1/1968 | Botka | 29—580 |

WILLIAM L. JARVIS, Primary Examiner

U.S. Cl. X.R.

29—574; 117—212, 227, 93; 156—17; 317—235